United States Patent
Kuo et al.

(10) Patent No.: US 7,808,995 B2
(45) Date of Patent: Oct. 5, 2010

(54) METHODS AND SYSTEMS FOR RELAYING DATA PACKETS

(75) Inventors: Yea Zong Kuo, Rockwall, TX (US); Jerry W. Yancey, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 380 days.

(21) Appl. No.: 11/600,935

(22) Filed: Nov. 16, 2006

(65) Prior Publication Data
US 2008/0117908 A1    May 22, 2008

(51) Int. Cl.
*H04L 12/28* (2006.01)

(52) U.S. Cl. .................. 370/392; 370/401

(58) Field of Classification Search .......... 370/389, 370/392, 401; 709/201–203, 227–230, 245–246
See application file for complete search history.

(56) References Cited

U.S. PATENT DOCUMENTS

| | | | |
|---|---|---|---|
| 4,528,658 A | 7/1985 | Israel | |
| 5,737,235 A | 4/1998 | Kean et al. | |
| 5,838,167 A | 11/1998 | Erickson et al. | |
| 5,941,988 A | 8/1999 | Bhagwat et al. | |
| 5,953,372 A | 9/1999 | Virzi | |
| 5,999,541 A * | 12/1999 | Hinchey et al. | 370/466 |
| 6,020,755 A | 2/2000 | Andrews et al. | |
| 6,075,380 A | 6/2000 | Lane | |
| 6,172,927 B1 | 1/2001 | Taylor | |
| 6,201,829 B1 | 3/2001 | Schneider | |
| 6,233,704 B1 | 5/2001 | Scott et al. | |
| 6,259,693 B1 | 7/2001 | Ganmukhi et al. | |
| 6,292,923 B1 | 9/2001 | Genrich et al. | |
| 6,333,641 B1 | 12/2001 | Wasson | |
| 6,381,238 B1 | 4/2002 | Hluchyj | |
| 6,385,236 B1 | 5/2002 | Chen | |
| 6,389,379 B1 | 5/2002 | Lin et al. | |
| 6,421,251 B1 | 7/2002 | Lin | |
| 6,496,291 B1 | 12/2002 | Raj et al. | |

(Continued)

FOREIGN PATENT DOCUMENTS

GB    2377138 A    12/2002

(Continued)

OTHER PUBLICATIONS

Laxdal, "ELEC 563 Project Reconfigurable Computers", http://www.ece.uvic.ca/~elaxdal/Elec563/reconfigurable_computers.html; printed from the Internet Dec. 19, 2003, Dec. 2, 1999, 10 pgs.

(Continued)

*Primary Examiner*—Chirag G Shah
*Assistant Examiner*—Jenkey Van
(74) *Attorney, Agent, or Firm*—O'Keefe, Egan, Peterman & Enders LLP (57) ABSTRACT

One or more nodes of a network may be configured to provide substitute header information for insertion into a received data packet and then to retransmit the data packet with the modified header information to other network destinations. One or more other downstream nodes may be configured to do likewise, thus allowing a packet to proceed through a selected number of multiple destinations in the network without being shortened, and so that the number of control words required in each packet is reduced, in increasing data bandwidth for the network.

30 Claims, 8 Drawing Sheets

U.S. PATENT DOCUMENTS

| | | | |
|---|---|---|---|
| 6,496,505 | B2 | 12/2002 | La Porta et al. |
| 6,617,877 | B1 | 9/2003 | Cory et al. |
| 6,651,225 | B1 | 11/2003 | Lin et al. |
| 6,721,313 | B1 | 4/2004 | Van Duyne |
| 6,873,180 | B2 | 3/2005 | Bentz |
| 6,888,376 | B1 | 5/2005 | Venkata et al. |
| 6,901,072 | B1 | 5/2005 | Wong |
| 6,934,763 | B2 | 8/2005 | Kubota et al. |
| 6,965,571 | B2 | 11/2005 | Webber |
| 6,993,032 | B1 | 1/2006 | Dammann et al. |
| 7,003,585 | B2 | 2/2006 | Phong et al. |
| 7,020,147 | B1 | 3/2006 | Amadon et al. |
| 7,035,228 | B2 | 4/2006 | Baumer |
| 7,111,110 | B1 | 9/2006 | Pedersen |
| 7,137,048 | B2 | 11/2006 | Zerbe et al. |
| 7,188,283 | B1 | 3/2007 | Shafer et al. |
| 7,224,184 | B1 | 5/2007 | Levi et al. |
| 7,260,650 | B1* | 8/2007 | Lueckenhoff ............... 709/246 |
| 7,506,297 | B2 | 3/2009 | Mukherjee et al. |
| 2002/0021680 | A1 | 2/2002 | Chen |
| 2002/0057657 | A1 | 5/2002 | La Porta et al. |
| 2002/0059274 | A1 | 5/2002 | Hartsell et al. |
| 2002/0093961 | A1* | 7/2002 | Sharma et al. ............. 370/392 |
| 2002/0095400 | A1 | 7/2002 | Johnson et al. |
| 2003/0009585 | A1 | 1/2003 | Antoine et al. |
| 2003/0026260 | A1 | 2/2003 | Ogasawara et al. |
| 2003/0167340 | A1 | 9/2003 | Jonsson |
| 2004/0085902 | A1 | 5/2004 | Miller et al. |
| 2004/0131072 | A1 | 7/2004 | Khan et al. |
| 2004/0156368 | A1 | 8/2004 | Barri et al. |
| 2004/0158784 | A1 | 8/2004 | Abuhamdeh et al. |
| 2004/0240468 | A1* | 12/2004 | Chin et al. .................. 370/466 |
| 2004/0249964 | A1* | 12/2004 | Mougel ...................... 709/231 |
| 2005/0044439 | A1 | 2/2005 | Shatas et al. |
| 2005/0169311 | A1 | 8/2005 | Millet et al. |
| 2005/0175018 | A1 | 8/2005 | Wong |
| 2005/0183042 | A1 | 8/2005 | Vogel et al. |
| 2005/0242834 | A1 | 11/2005 | Vadi et al. |
| 2005/0248364 | A1 | 11/2005 | Vadi et al. |
| 2005/0256969 | A1 | 11/2005 | Yancey et al. |
| 2006/0002386 | A1 | 1/2006 | Yik et al. |

OTHER PUBLICATIONS

"PCI/DSP-4 Four Complete Channels Of Digital Acoustic Emission Data Acquisition On A Single Board", http://www.pacndt.com/products/Multichannel/pcidsp.html, printed from the Internet Dec. 19, 2003, 3 pgs.

Zaiq Technologies, "Innovation: Methodology Briefs", http://www.zaiqtech.com/innovation/m_fpga.html, printed from the Internet Jan. 15, 2004, 12 pgs.

Hardt et al, "Flysig: Dataflow Oriented Delay-Insensitive Processor For Rapid Prototyping Of Signal Processing", (obtained from Internet Dec. 2003), 6 pgs.

Chang et al., "Evaluation Of Large Matrix Operations On A Reconfigurable Computing Platform For High Performance Scientific Computations," (obtained from Internet Dec. 2003), 10 pgs.

Alkfe, "FPGA Configuration Guidelines," XAPP, 090 Nov. 24, 1997, Version 1.1, pp. 31-38.

"XC18V00 Series Of In-System Programmable Configuration PROMs", Xilinx Product Specification, DS026 (v.3.0), Nov. 12, 2001, 19 pgs.

Thacker, "System ACE Technology: Configuration Manager Breakthrough", New Technology, FPGA Configuration, Xcell Journal, Summer 2001, pp. 52-55.

"System ACE MPM Solution", Xilinx Product Specification, DS087 (v1.0) Sep. 25, 2001, 29 pgs.

"RapidIO™: An Embedded System Component Network Architecture", Architecture And Systems Platforms, Feb. 22, 2000, 25 pgs.

"Raceway Internlink Functional Specification", Mercury Computer Systems, Inc., Nov. 8, 2000, 118 pgs.

"[XMC-3310] High Speed Transceiver ePMC Module", Spectrum Signal Processing, http://www.spectrumsignal.com/Products/_Datasheets/XMC-3310_datasheet.asp, (© 2002-2004), 5 pgs. (this reference describes a product available prior to the May 11, 2004 filing date of the present application).

"XMC-3310 High Speed Transceiver ePMC Module", Spectrum Signal Processing, Rev. May, 2004, 4 pgs. (this reference describes a product available prior to the May 11, 2004 filing date of the present application).

RocketIO™ Transceiver User Guide, Xilinx, UG024 (v2.3) Feb. 24, 2004, 152 pgs.

"The FPGA Systems Connectivity Tool", Product Brief, Nallatech, DIMEtalk 2.1, Feb. 2004, pp. 1-8.

B. Hall, "BTeV Front End Readout & Links", BTEV Co., Aug. 17, 2000, 11 pgs.

Irwin, "Usage Models for Multi-Gigabit Serial Transceivers", Xilinx, xilinix.com, White Paper, WP157 (v1.0), Mar. 15, 2002, 10 pgs.

Campenhout, "Computing Structures And Optical Interconnect: Friends Or Foes?", Department of Electronics And Information Systems, Ghent University, Obtained from Internet Oct. 8, 2006, 11 pgs.

E. Hazen, "HCAL HO Trigger Link", Optical SLB-HTR Interface Specification, May 24, 2006, 4 pgs.

G. Russell, "Analysis and Modelling Of Optically Interconnected Computing Systems", School of Engineering And Physical Sciences, Heriot-Watt University, May 2004, 170 pgs.

Copending U.S. Appl. No. 11/529,712; LCOM:011C1, entitled "Systems And Methods For Interconnection Of Multiple FPGA Devices", filed Sep. 28, 2006; 42 pgs.

Copending U.S. Appl. No. 11/529,713; LCOM:011C2, entitled "Systems And Methods For Interconnection Of Multiple FPGA Devices", filed Sep. 28, 2006; 42 pgs.

Copending U.S. Appl. No. 11/600,934; LCOM:057, entitled "Reconfigurable Communications Infrastructure For ASIC Networks", filed Nov. 16, 2006; 72 pgs.

Search Report, PCT/US07/23699; Apr. 3, 2008; 2 pgs.

* cited by examiner

METHODS AND SYSTEMS FOR RELAYING DATA PACKETS

BACKGROUND OF THE INVENTION

1. Field of the Invention

This invention relates generally to network communications, and more particularly to network data packet transfer.

2. Description of the Related Art

In the past, data has been directed to multiple network destinations by either sending data packets to multiple network destinations or by relaying data packets in a network by employing a series of embedded "header" words whose embedded bit fields direct the progress of a given packet through a series of intermediate destinations, or "nodes" in the network. In the latter case, when a given packet is received at a given node the current header is stripped off, shortening the packet and causing the next word to become the new header. Broadcast (i.e., sending the same packet to multiple destinations) complicates this process and may require even more control words to be inserted in each packet.

SUMMARY OF THE INVENTION

Disclosed are methods and systems for data packet transfer in networks using individual network nodes (e.g., packet routers, hubs, relay points, processor nodes, servers, etc.) to relay data packets. In the practice of the disclosed methods and systems, one or more nodes of a network may be configured to provide substitute header information for insertion into a received data packet and then to retransmit the data packet with the modified header information to other network destinations. In one exemplary embodiment, one or more network nodes may each be provided with a header modification module (e.g., such as a hardware module containing a state machine, storage register, and multiplexers, an embedded processor module with appropriate programming, etc.) that may be pre-programmed with a substitute header (e.g., programmed with a substitute header prior to receipt and retransmission of a given data packet) and that operates to substitute the pre-programmed header into the first word of the packet prior to retransmittal of the data packet from the network node, for example, to a new set of network destinations. One or more other downstream nodes may be configured to do likewise, thus allowing a packet to proceed through a "daisy chain" or "tree" of multiple and virtually unlimited selected number of destinations in the network without being shortened. Advantageously, the disclosed methods and systems may be so implemented without requiring the use of a series of embedded packet header words or multiple packets to direct data to multiple network destinations so that the number of control words required in each packet is reduced, ultimately increasing data bandwidth for networks that must transfer or broadcast long data streams.

A node may be configured to insert substitute header information into a given data packet in any suitable manner. For example, a given node may be configured to substitute a pre-programmed header into the first word of all data packets received by the node, and to retransmit the data packet. Alternatively, insertion of substitute header information into a given data packet may be controlled, for example, by providing a header modification indicator (e.g., special header modification bit (or bits) that is set active in the data packet) so that when a given packet is received by the node that has the header modification bit/s set active, the node operates to substitute the pre-programmed header into the first word of the data packet and then retransmits the data packet. In the latter case, when a data packet is received with the header modification bit/s not set active (or set inactive), the node does not substitute the pre-programmed header into the first word of the data packet. In the practice of the disclosed methods and systems a header modification bit may be set active by a network node that is the source of the received data packet (e.g., set active at the direction of a user and/or by computer logic running at the source network node).

In yet another possible alternative, a node may be pre-programmed with substitute header information that includes multiple possible substitute headers (e.g., with each substitute header corresponding to a different network destination or a different combination of two or more network destinations) from which a particular substitute header is to be selected and inserted into a given data packet that is then retransmitted to the corresponding network destination/s. In this latter case, selection of a particular substitute header from the multiple substitute headers may be made based on the identity of a header modification bit or bits set active (e.g., by a source network node) in the given data packet received by the node, e.g., so that selection of the desired ultimate network destinations may be made at a source of the given data packet by setting the appropriate bit/s active. It is also possible that a node may be configured to retransmit a given received data packet multiple times (e.g., to two or more different destinations or to two or more different combinations of destinations) based on the identity of a header modification bit or bits set active in the data packet received by the node.

In the practice of the disclosed methods and systems, a network node may be programmed and/or re-programmed with substitute header information in any suitable manner. For example, a given network node may be initially programmed with substitute header information (e.g. corresponding to a given network destination or to a given combination of network destinations) by means of a special command packet sent to the node prior to or during network operation. It is also possible that a given network node may subsequently be re-programmed with different substitute header information (e.g. corresponding to a different network destination or a different combination of network destinations) by means of direct I/O access from a control node or local processor. In one exemplary embodiment, such programming and/or re-programming may take place in a dynamic manner, e.g., during data processing operations being carried out between a source of a given data packet, a node in which substitute header information is being inserted into the given data packet received form the source of the given data packet, and/or one or more network destinations of the given data packet.

In one embodiment, the disclosed methods and systems may be implemented at one or more individual network nodes in a hardware-based manner, e.g., by using reconfigurable hardware (such as field programmable gate arrays (FPGAs), fixed hardware (such as fixed program Application-Specific Integrated Circuits (ASICs), embedded processor nodes (such as embedded PowerPC processors, etc.), etc.) at each of the one or more network nodes to provide data broadcast and data routing capabilities. In one exemplary embodiment, the disclosed methods and systems may be advantageously implemented for data packet transfer within networks of multiple interconnected FPGA devices, e.g., such as FPGA-based schemes employing local and high bandwidth networks designed to carry data streams. In another embodiment, the disclosed methods and systems may be implemented in a wide variety of other network router applications, and with network protocols that do not have the embedded series of header words for routing, e.g., networks using look-up table routers, fixed routing schemes, etc.

In one respect, disclosed herein is a method of relaying data packets within a network, including: receiving a first data packet at a first network node from the network, the first data packet having an original header including first network destination information and a first header modification indicator, and the first network destination information including a network destination of the first network node; analyzing the received first data packet at the first network node to detect the presence of the first header modification indicator; replacing the original header of the first data packet at the first network node with a first substitute header based upon the detection of the first header modification indicator, the first substitute header including second network destination information that is different than the first network destination information of the original packet header, and the second network destination information including a network destination of at least one additional network node that was not included in the first network destination information of the original packet header of the first data packet; and transmitting the first data packet having the first substitute header from the first network node across the network to the network destination of the at least one additional network node that was not included in the first network destination information of the original packet header.

In another respect, disclosed herein is a method of relaying data packets within a network, including: transmitting a first data packet from a first network node across the network to a second network node, the first data packet having an original header including first network destination information and a first header modification indicator, and the first network destination information including a network destination of the second network node; receiving the first data packet at the second network node from the network; analyzing the received first data packet at the second network node to detect the presence of the first header modification indicator; replacing the original header of the first data packet at the second network node with a first substitute header based upon the detection of the first header modification indicator, the first substitute header including second network destination information that is different than the first network-destination information of the original packet header, and the second network destination information including a network destination of at least one additional network node that was not included in the first network destination information of the original packet header of the first data packet; transmitting the first data packet having the first substitute header from the second network node across the network to the network destination of the at least one additional network node that was not included in the first network destination information of the original packet header; and receiving the first data packet at the at least one additional network node that was not included in the first network destination information of the original packet header. The method may further include creating the first header modification indicator at the first network node prior to the step of transmitting the first data packet from the first network node across the network to the second network node.

In another respect, disclosed herein is a network node for relaying data packets within a network, the network node including a header modification module configured to: receive a first data packet, the first data packet having an original header including first network destination information and a first header modification indicator, and the first network destination information including a network destination of the network node; analyze the first data packet to detect the presence of the first header modification indicator; replace the original header of the first data packet with a first substitute header based upon the detection of the first header modification indicator, the first substitute header including second network destination information that is different than the first network destination information of the original packet header, and the second network destination information including a network destination of at least one additional network node that was not included in the first network destination information of the original packet header of the first data packet; and provide the first data packet having the first substitute header for transmittal from the network node across the network to the network destination of the at least one additional network node that was not included in the first network destination information of the original packet header.

In another respect, disclosed herein is a network for processing data, including: a first network node; a second network node; and at least one additional network node. The first network node may be configured to create a first header modification indicator in a first data packet and to transmit the first data packet across the network to the second network node, the transmitted first data packet having an original header including first network destination information and the first header modification indicator, and the first network destination information including a network destination of the second network node. The second network node may be configured to receive the first data packet, and analyze the received first data packet to detect the presence of the first header modification indicator, and may be further configured to replace the original header of the first data packet with a first substitute header based upon the detection of the first header modification indicator, the first substitute header including second network destination information that is different than the first network destination information of the original packet header, and the second network destination information including a network destination of the at least one additional network node that was not included in the first network destination information of the original packet header of the first data packet. Additionally, the second network node may be further configured to transmit the first data packet having the first substitute header across the network to the network destination of the at least one additional network node that was not included in the first network destination information of the original packet header.

DESCRIPTION OF ILLUSTRATIVE EMBODIMENTS

Figure 1:
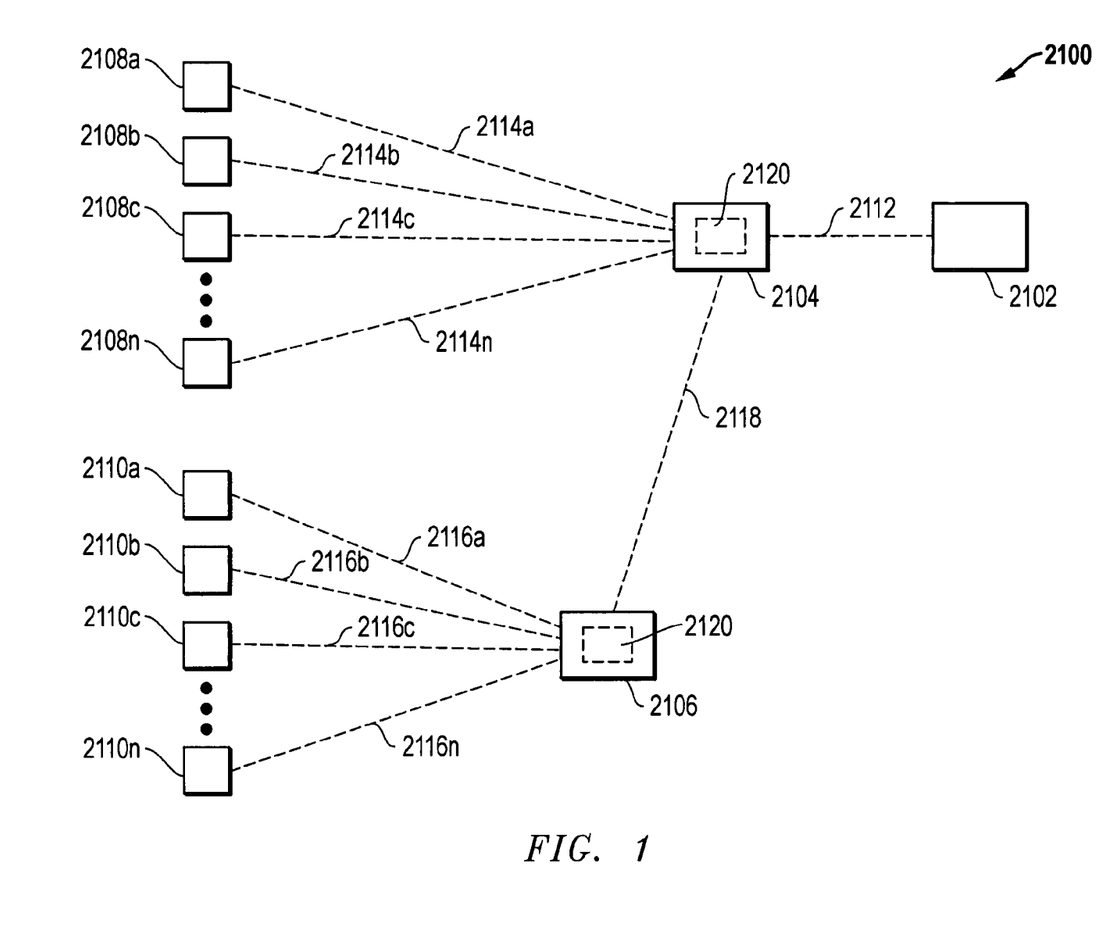
FIG. 1 illustrates a network according to one exemplary embodiment of the disclosed methods and systems.

FIG. 1 illustrates a network 2100 that includes multiple network nodes 2102, 2104, 2106, 2108a-2108n and 2110a-2110n that are communicatively coupled via respective network interconnections 2112, 2114a-2114n, 2116a-2116n and 2118 in the manner shown. It will be understood that the embodiment of FIG. 1 is exemplary only and that the disclosed methods and systems may be implemented for data packet transfer between any two or more network nodes in any type of network environment, e.g., for intra-device network communications between network nodes within a given computing device such as a FPGA or other type of ASIC device having an internal packet router (e.g., communications between one or more local destinations within a given device, such as between processing functions and/or interfaces of the given device), inter-device network communications between computing device nodes (e.g., network communications between microprocessors, CPUs, FPGAs or other type of ASIC devices, etc.), for network communications between computing system nodes such as network servers, network routers, network access points, network clients (e.g., personal computers, workstations, etc.), etc. Examples of network environments in which the disclosed methods and systems may be employed for data packet transfer may be found in U.S. patent application Ser. No. 10/843,226 (published as United States Patent Application Publication No. 20050256969) and in U.S. patent application Ser. No. 11/600,934 entitled "Reconfigurable Communications Infrastructure for ASIC Networks" by Yancey, et al. filed on the same date as the present application, each of the foregoing being incorporated herein by reference and the specification of the latter being appended hereto to form a part of the present disclosure.

Still referring to FIG. 1, each of network nodes 2102, 2104, 2106, 2108a-2108n and 2110a-2110n may be any type of network entity (e.g., computing device) that is capable of transmitting and/or receiving data packets in a manner that is suitable for implementing one or more embodiments of the disclosed methods and systems as disclosed herein. Specific examples of suitable network nodes include, but are not limited to, packet routers, hubs, relay points, processor nodes, servers, etc.

In the illustrated exemplary embodiment of FIG. 1, each of network interconnections 2112, 2114a-2114n, 2116a-2116n and 2118 represent a separate logical interconnection that may exist between two network nodes of network 2100. In this regard, each of network interconnections 2112, 2114a-2114n, 2116a-2116n and 2118 may represent a separate logical interconnection that may be made between two network nodes across a common wired or wireless network communication medium, and/or any one or more of network interconnections 2112, 2114a-2114n, 2116a-2116n and 2118 may itself be an interconnection between two network nodes across a separate network communication medium. In either case, a network communication medium may be any hardwire or wireless communication medium that is suitable for transferring data packets bi-directionally between corresponding network nodes. Specific examples of suitable network communication media types include, but are not limited to, local area network (LAN) communication media such as wired Ethernet (e.g., 10Base5, 10Base2, 10BaseT, 100BaseT, etc.) wireless local area network (WLAN) (e.g., 802.11 such as "WiFi") compatible communication media, cellular wireless communication media, etc. Specific examples of suitable high bandwidth interconnection mediums include, but are not limited to, optical transmission media such as fiber optic transmission medium that employs wavelength division multiplexing (WDM) or dense wavelength division multiplexing (DWDM) technology, fiber optic ribbon transmission medium that employs parallel optical fibers, wireless optical transmission mediums such as free space optics (FSO) laser communications technology, etc. Non-optical high bandwidth interconnection mediums may also be employed including, but not limited to, high bandwidth wired interconnection technologies such as Skyrail, Ethernet, Gigabit Ethernet, Universal Serial Bus (USB), Firewire, Infiniband, Serial and Parallel RapidIO, PCIe, Fibre Channel, and high bandwidth radio frequency (RF) wireless interconnection technologies such as CDMA, TDMA, WCDMA, GSM, EDGE, 802.11a, 802.11b, 802.11 g, 802.11n, Multiple Input/Multiple Output (MIMO), Ultra-Wideband (UWB) wireless, etc.

In one exemplary embodiment, each of network nodes 2104 and 2106 of FIG. 1 may be configured to provide substitute header information for insertion into a data packet received from another node of network 2100, and to then retransmit the data packet with the modified header information to one or more network node destinations. For example, in the illustrated embodiment, each of network nodes 2104 and 2106 are shown provided with a header modification module 2120 that may be implemented at each network node as hardware, software, firmware, or as any combination thereof. Such a header modification module 2120 may be pre-programmed with substitute header information for insertion into data packet/s that are received by the given node 2104 or 2106, prior to re-transmission of the received data packet/s by the given node 2104 or 2106 to other network nodes. In this regard, substitute header information may include any information suitable for insertion into a given received data packet that is indicative of one or more network destinations (e.g., network nodes) for the given data packet. Although a network node such as network nodes 2104 and 2106 may be configured to automatically modify header information of all received data packets, in one exemplary embodiment, a network node may be configured to only modify header information of those received data packets that include a header modification indicator in a manner as will be described further herein.

Figure 2:
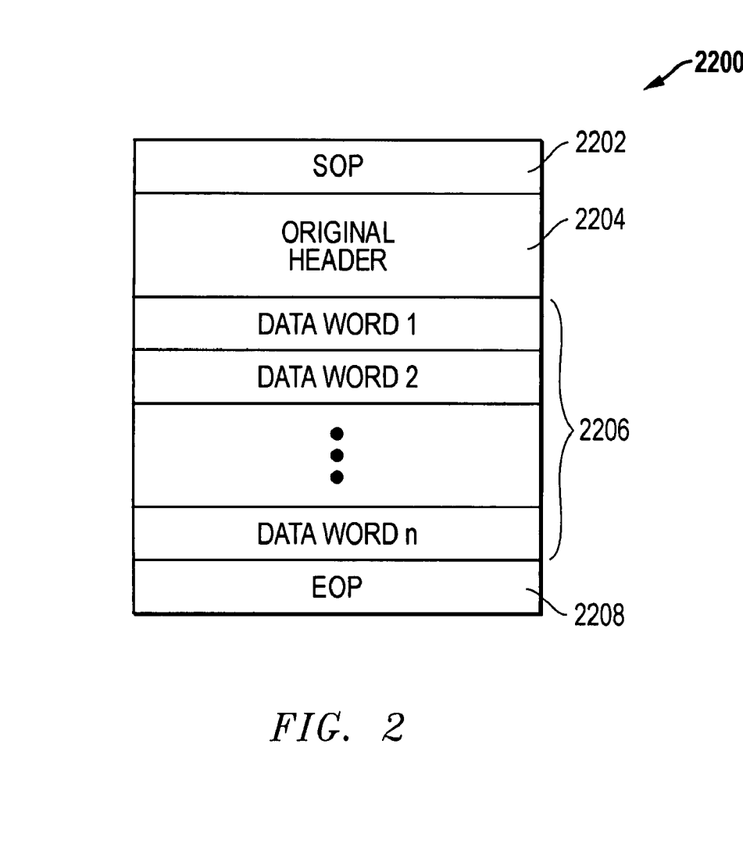
FIG. 2 illustrates a data packet according to one exemplary embodiment of the disclosed methods and systems.

In one exemplary embodiment, a header modification module 2120 may replace the complete header of a data packet received by a given network node, such as node 2104 or 2106 of FIG. 1. For example, FIG. 2 illustrates one exemplary embodiment of a data packet 2200 as it may be received by a network node 2104 or 2106. As illustrated in FIG. 2, following the start-of-packet ("SOP") indicator 2202, data packet 2200 includes an original header 2204 that includes network source and network destination information, e.g., such as source identification information (source ID) and destination identification (destination ID) information used to route the data packet to the current network node that includes a header modification module 2120. Following original header 2204 is data payload 2206 that in the illustrated embodiment is organized into a series of data words, although other data payload configurations are also possible. Also illustrated in FIG. 2 are end-of-packet ("EOP") indicator 2208. It will be understood that the embodiment of FIG. 2 is exemplary only, and that other data packet configurations may be utilized in the practice of the disclosed methods and systems, including data packet configurations having fewer, additional and/or alternative fields.

Figure 3:
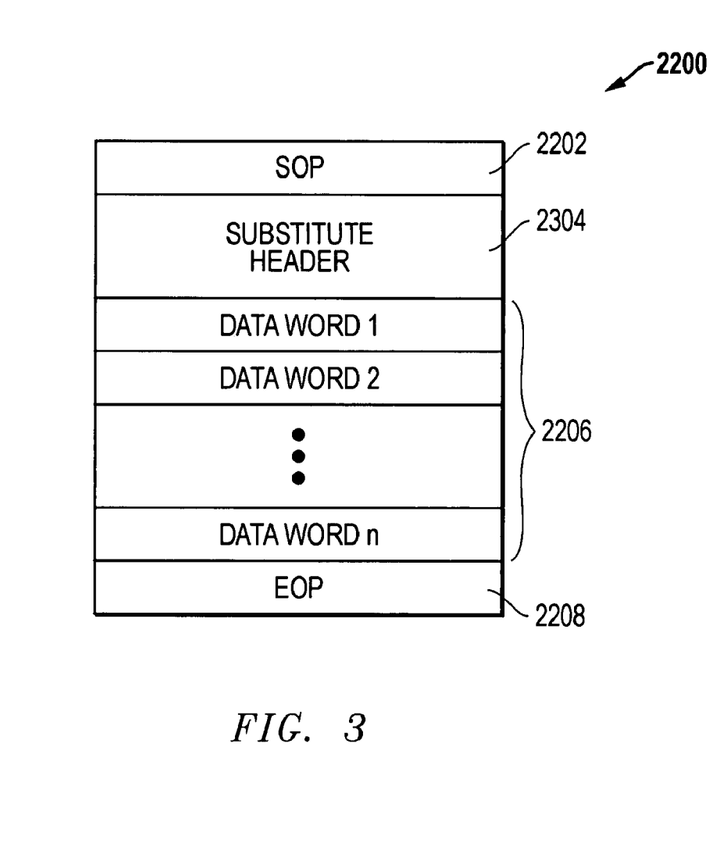
FIG. 3 illustrates a data packet according to one exemplary embodiment of the disclosed methods and systems.

FIG. 3 illustrates data packet 2200 of FIG. 2 that has been modified by a header modification module 2120 of a network node, such as network node 2104 or 2106 of FIG. 1. As shown in FIG. 3, original header 2204 has been replaced with substitute header 304. Substitute header 304 includes network destination information that is different than the network destination information that was included in original header 2204. In this exemplary embodiment, the remaining components (e.g., start-of-packet ("SOP") indicator 2202, data payload 2206 and end-of-packet ("EOP") indicator 2208) of data packet 2200 remains the same as the original received data packet, although it is possible that one or more other components of a data packet may also be modified, replaced and/or substituted at the same time that header information is modified or substituted by a header modification module 2120 of a network node, such as network node 2104 or 2106 of FIG. 1.

In one exemplary embodiment, data packet 2200 of FIG. 2 may include a data payload 2206 having an original header 2204 corresponding to a first network protocol format, and modified data packet 2200 may include data payload 2206 and substitute header 304 corresponding to a second network protocol format. Additionally, it is possible that data payload 2206 and/or other information contained in data packet 2200 may correspond to the second network protocol type. Such a configuration may be implemented to allow data packet 2200 including data payload 2206 to be originally transmitted with original header 2204 across a network interconnection (e.g., to a first network node such as network node 2104 or 2106) using the first protocol format, and then to be retransmitted (e.g., from the first network node to multiple other network nodes that operate according to the second network protocol but not the first network protocol) across a network interconnection with substitute header 304 using the second protocol format. In such an exemplary embodiment as described above, FIG. 3 may represent data packet 2200 as it may be modified at the network node with a substitute header 304 of the second protocol type for re-transmission to one or more network nodes according to the second protocol.

For example, original header 2204 may be a TCP/IP format header and data payload 2206 be a data payload corresponding to a data packet suitable for communication in a PRISM infrastructure such as described in U.S. patent application Ser. No. 10/843,226 (published as United States Patent Application Publication No. 20050256969) and in U.S. patent application Ser. No. 11/600,934 entitled "Reconfigurable Communications Infrastructure for ASIC Networks" by Yancey, et al. filed on the same date as the present application, which have each been incorporated herein by reference and the specification of the latter being appended hereto to form a part of the present disclosure. Using such a data packet configuration, the original header 2204 may be employed to route the PRISM data payload 2206 using TCP/IP protocol from a source network node (e.g., network node 2102) to a destination network node (e.g., network node 2104). The receiving network node (e.g., network node 2104) may then replace the original TCP/IP header 2204 with a substitute header 304 that corresponds to the PRISM format and for routing between interconnected multiple computing devices using PRISM packet router/s.

Figure 4:
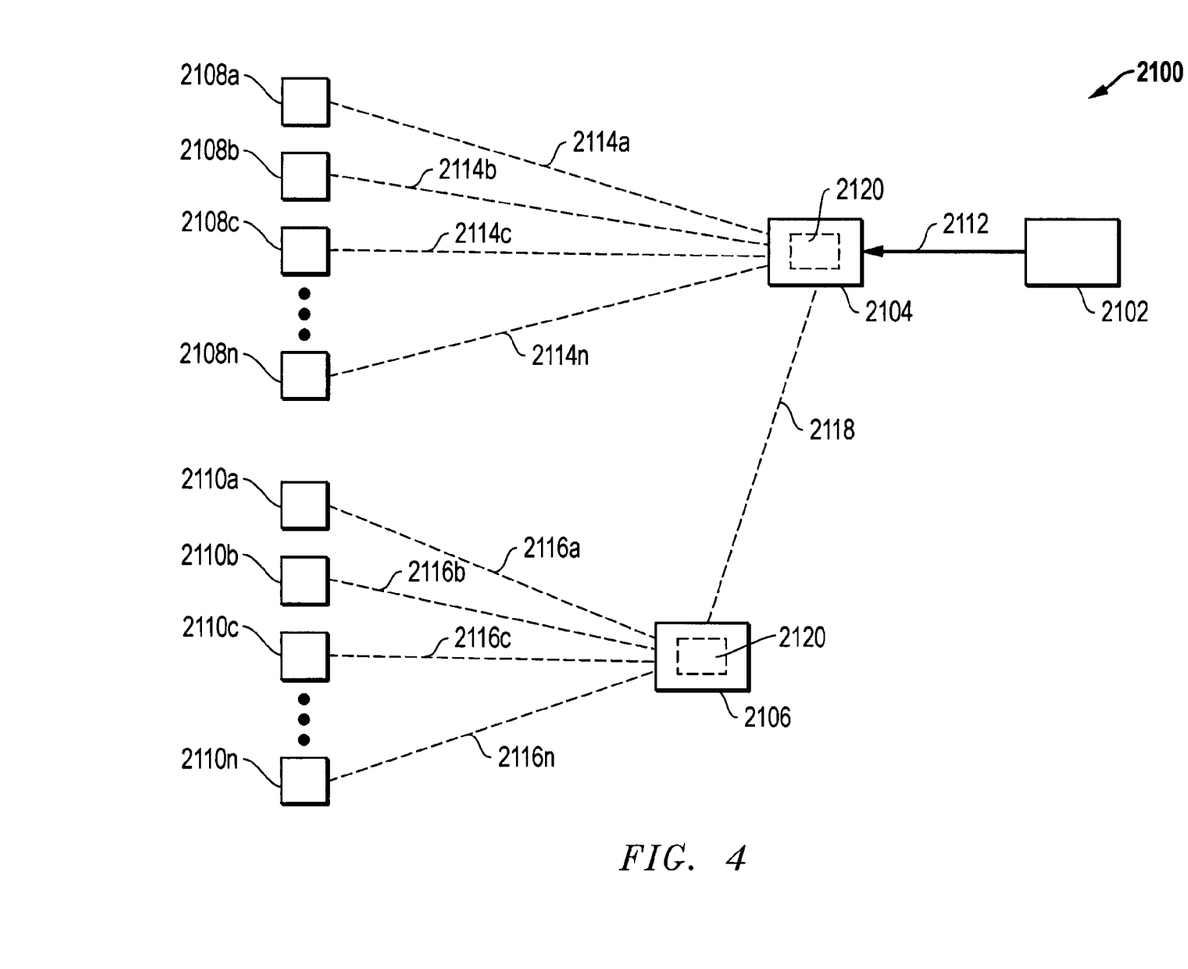
FIG. 4 illustrates a network according to one exemplary embodiment of the disclosed methods and systems.
Figure 5:
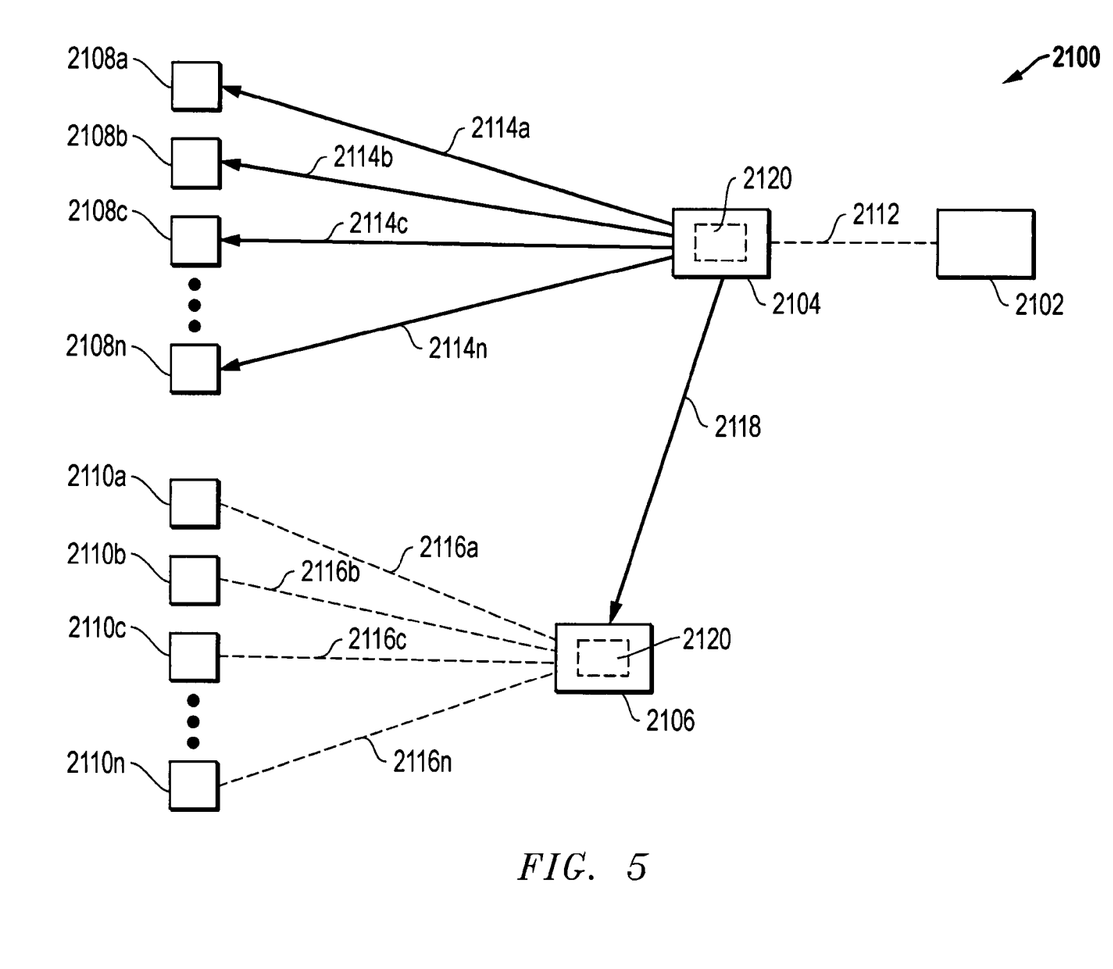
FIG. 5 illustrates a network according to one exemplary embodiment of the disclosed methods and systems.

The solid arrowed line in FIG. 4 illustrates transmittal of data packet 2200 with original header 2204 from network node 2102 to network node 2104 across network communication medium 2112. In this embodiment, original header 2204 includes destination information (e.g., destination ID information) that routes data packet 2200 to network node 2104 and also includes a header modification indicator (e.g., in the form of a header modification bit that is set active) to indicate to network node 2104 that original header 2204 is to be replaced with substitute header 304. When network node 2104 receives data packet 2200, header modification module 2120 recognizes the header modification indicator by reading the active header modification bit and then inserts substitute header 304 in place of original header 2204 in data packet 2200. Substitute header 304 includes destination information for routing data packet 2200 to a new set of destinations (i.e., network node 2106 and network nodes 2108-2108*n*) in network 2100 that was not contained in the original header 2204 of data packet 2200. Network node 2104 then retransmits data packet 2200 with substitute header 304 to network node 2106 across network communication medium 2118 and to network nodes 2108-2108*n* across respective network interconnections 2114*a* to 2114*n* as shown by solid arrowed lines in FIG. 5. For those data packets received from network node 2102 by network node 2104 that do not have the header modification indicator (e.g., header modification bit that is not present or is not set active), then header modification module 2120 of network node 2104 does not modify the header of the data packet and the data packet is instead treated by network node 2104 as a conventional data packet, i.e., the original destination information contained in the data packet transmitted from network node 2102 is used to route the data packet through network 2100.

Figure 6:
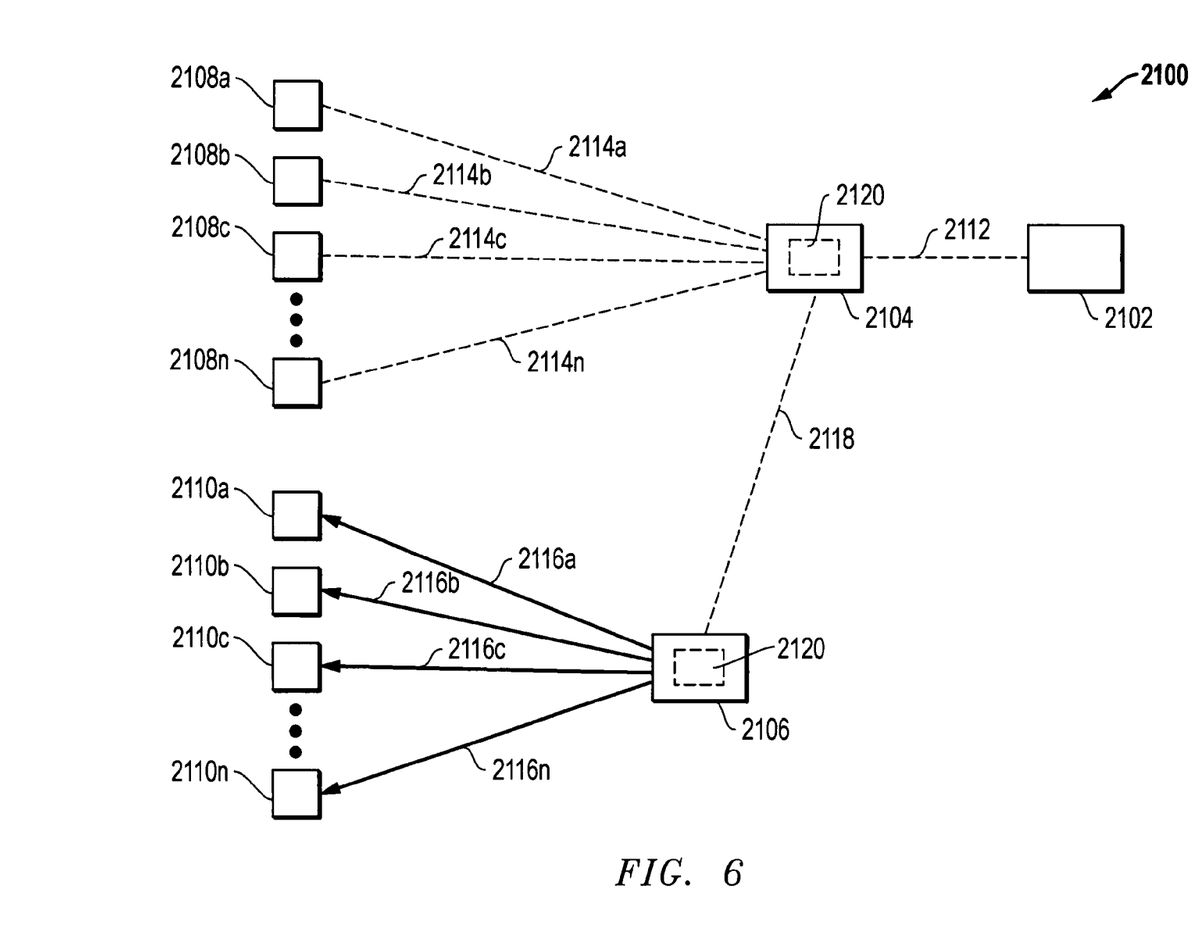
FIG. 6 illustrates a network according to one exemplary embodiment of the disclosed methods and systems.

It will be understood that multiple network nodes in a given network may be optionally configured to modify header information. This capability may be taken advantage of to create a "daisy chain" or "tree" of multiple destinations in the network that are not required to be indicated in the original header of the packet as it is originally transmitted in the network. For example, data packet 2200 of FIG. 3 with substituted header 304 may be received from network node 2104 at network node 2106 as indicated by solid arrowed line in FIG. 5. Data packet 2200 of FIG. 3 may also include a header modification indicator and network node 2106 may also be configured with a header modification module 2120. When network node 2106 receives data packet 2200 in such a case, header modification module 2120 of network node 2105 recognizes the header modification indicator and then inserts another substitute header in place of substitute header 304 in data packet 2200. This new substitute header includes destination information for routing data packet 2200 to another new set of destinations (i.e., network nodes 2110*a*-2110*n*) in network 2100 that was not contained in either the original header 2204 or in the substitute header 304 of data packet 2200, and does not contain the destination information for the previous set of destinations. Network node 2106 then retransmits data packet 2200 with this new substitute header to network nodes 2110*a*-210*n* across respective network interconnections 2116*a* to 2116*n* as shown by solid arrowed lines in FIG. 6.

A process such as described above in relation to FIGS. 4 through 6 may be repeated multiple times, allowing a data packet to be transmitted to a large number of destinations, and/or through a large number of intermediate network nodes, without requiring the destination information (e.g., destination ID information) for these network destinations and intermediate network nodes to be included in the original data packet as transmitted from its source, and/or as transmitted by another (e.g., intermediate) network nodes. In one exemplary embodiment, a data packet may be so broadcast to all network destinations from a source without requiring that the original header of the data packet transmitted from the source to include destination information (e.g., destination ID information) for all network nodes. Instead, the source node of a data packet may set a header modification indicator of the data packet to correspond to a "broadcast mode" for all network nodes, and then transmit the data packet to one or more intermediate or router network nodes. The intermediate or router network node/s may receive the data packet, recognize the broadcast header modification indicator, replace the original header of the data packet with a substitute header that includes destination ID for all network nodes and then retransmit the data packet to all network nodes. Thus, the disclosed methods and systems may be utilized to reduce the size and/or processing required for a given data packet, thus increasing data transmission bandwidth for a network such as network 2100.

Figure 7A:
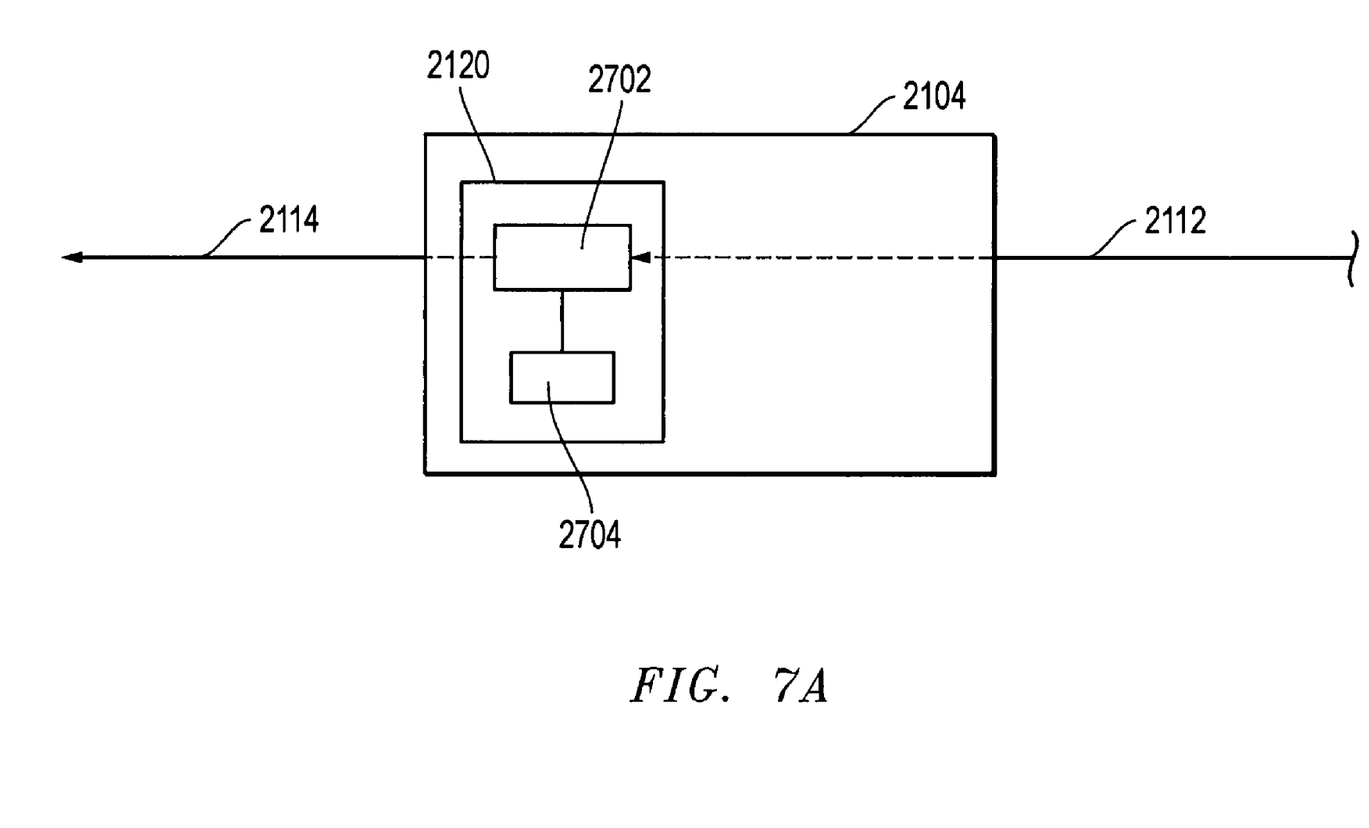
FIG. 7A illustrates a network node according to one exemplary embodiment of the disclosed methods and systems.

FIG. 7A illustrates an exemplary network node (in this example shown as network node 2104) as it may be configured with a header modification module 2120 according to one exemplary embodiment of the disclosed methods and systems. It will be understood that the embodiment of FIG. 7A may be implemented at a given network node using any configuration of hardware, software, and/or firmware that is suitable for accomplishing one or more of the header modification tasks of the disclosed methods and systems, and that network node configurations other than illustrated in FIG. 7A that are suitable for implementing the disclosed header modification tasks may alternatively be employed. In one exemplary embodiment, the configuration of FIG. 7A may be implemented using reconfigurable hardware (such as a field programmable gate array (FPGA) device), thus allowing the interconnection of embedded processors, interface modules, and user modules via the supported network.

In the exemplary illustration of FIG. 7A, network node 2104 is shown configured to receive a data packet 2200 with original header 2204 from exemplary network interconnection 2112, and then to provide data packet 2200 with substitute header 304 to exemplary network interconnection 2114. In this embodiment, header modification module 2120 includes a data packet processing component 2702 that is configured with logic to process a received data packet 2200 by reading the packet to determine if a header modification indicator is present in the received data packet and to replace original header 2204 with substitute header 304 if a header modification indicator is found to be present in data packet 2200. Header modification module 2120 is also shown configured with memory 2704 (e.g., volatile or non-volatile memory, magnetic or optical disk, etc.) coupled to data packet processing component 2702.

In the illustrated embodiment of FIG. 7A, memory 2704 may be pre-programmed with substitute header information for insertion into data packets received by network node 2104. Such substitute header information may include destination information for any one or more network destinations within network 2100 and, in one exemplary embodiment, may include destination information for a set of multiple network destinations, e.g., corresponding to a network broadcast. In one exemplary embodiment, module 2120 may be optionally configured so that substitute header information contained within memory 2704 may be re-programmed during network operations, e.g., to change the destination information to correspond to a different set of network destinations for insertion into a received data packet as substitute header information. Pre-programming or re-programming of destination information into memory 2704 may be performed using any suitable methodology and, in one embodiment, may be accomplished by a special command packet sent via the network to the node prior to or during network operation.

In one exemplary embodiment, memory 2704 of FIG. 7A may be programmed (e.g., pre-programmed or re-programmed) with destination information for more than one set of network destinations to allow selection of a given set of network destinations for insertion as substitute header information into any given received data packet that is to be retransmitted. In such a case, selection of a given set of network destinations for insertion as substitute header information into a given data packet may be made, for example, based on characteristics of a header modification indicator in the given received data packet, e.g., based on the identity of header modification bit (or bits) that is set active in the data packet. For example, a first header modification bit set active in the received data packet may indicate to module 2120 that a first set of network destinations is to be inserted into the received data packet as substitute header information, and a second header modification bit set active in the received data packet may indicate to module 2120 that a second and different set of network destinations is to be inserted into the received data packet as substitute header information.

Figure 7B:
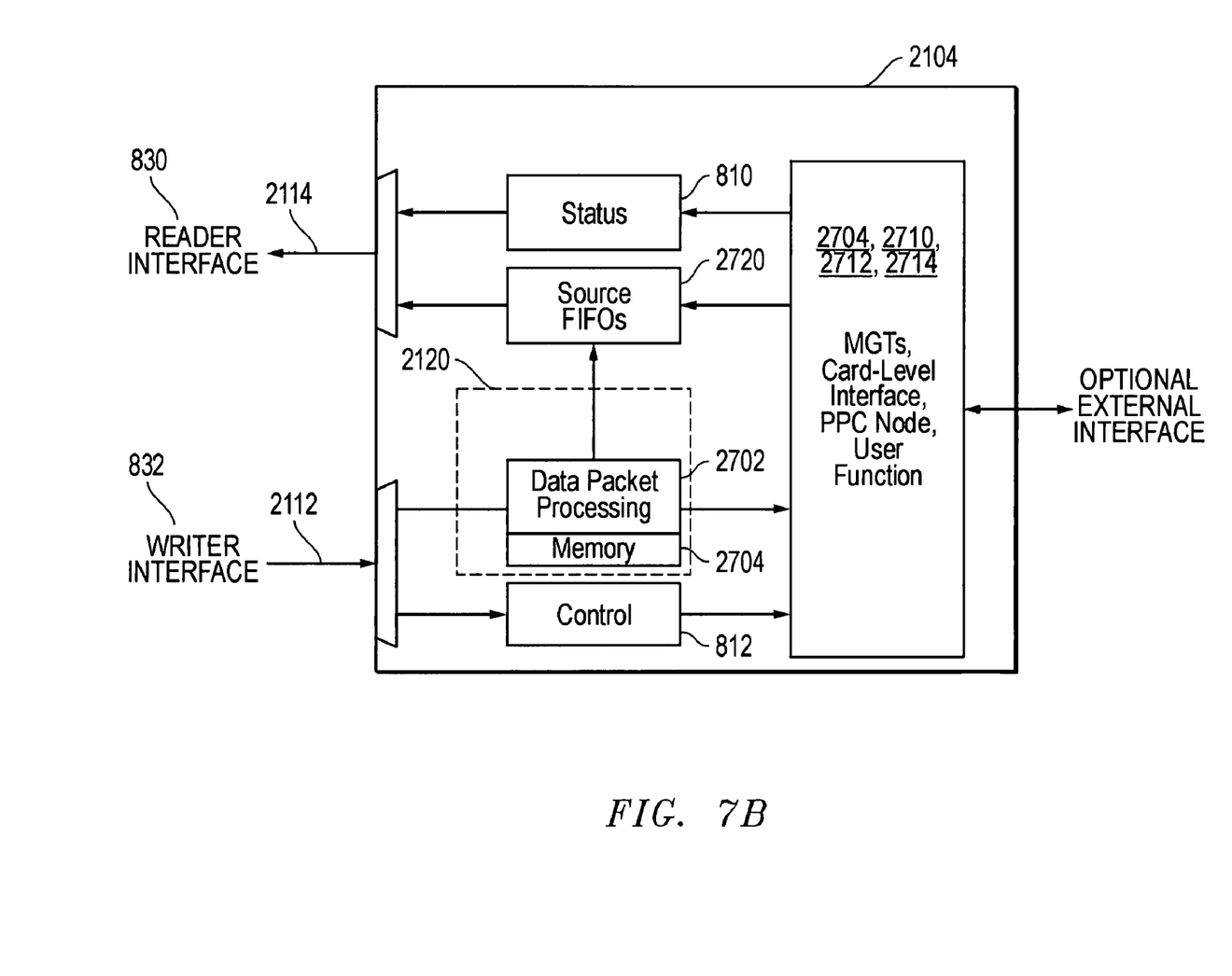
FIG. 7B illustrates a network node according to one exemplary embodiment of the disclosed methods and systems.

FIG. 7B illustrates one exemplary embodiment of a PRISM router interface wrapper implemented by a computing device (e.g., ASIC device or reconfigurable ASIC device such as FPGA) and as it may be configured as a network node 2104 having a header modification module 2120 configured with a data packet processing component 2702 and memory 2704 that operate in the manner previously described. Although not shown in FIG. 7B, header modification module 2120 may also include or otherwise be configured to operate with a destination FIFO interface 721. Further information on components of a PRISM router interface wrapper configuration may be found described and illustrated in relation to FIG. 8 of the specification of "METHODS AND SYSTEMS FOR INTERCONNECTION OF MULTIPLE FPGA DEVICES" by Yancey, et al. which is appended hereto as a part of the present disclosure.

As shown, network node 2104 of FIG. 7B is configured to receive a data packet 2200 with original header 2204 from exemplary network interconnection 2112, and then to provide modified data packet 2200 with substitute header 304 to network destination/s via exemplary network interconnection 2114 via source FIFO 720. In this exemplary embodiment, header modification module 2120 is also shown configured to provide modified data packets 2200 to intra-device network destinations (e.g., router interface ports with MGTs 2704, card-level interface/s 710, processor/s 712, user-defined function/s 714, etc.) and/or to other external network destinations via optional external interface.

Figure 8:
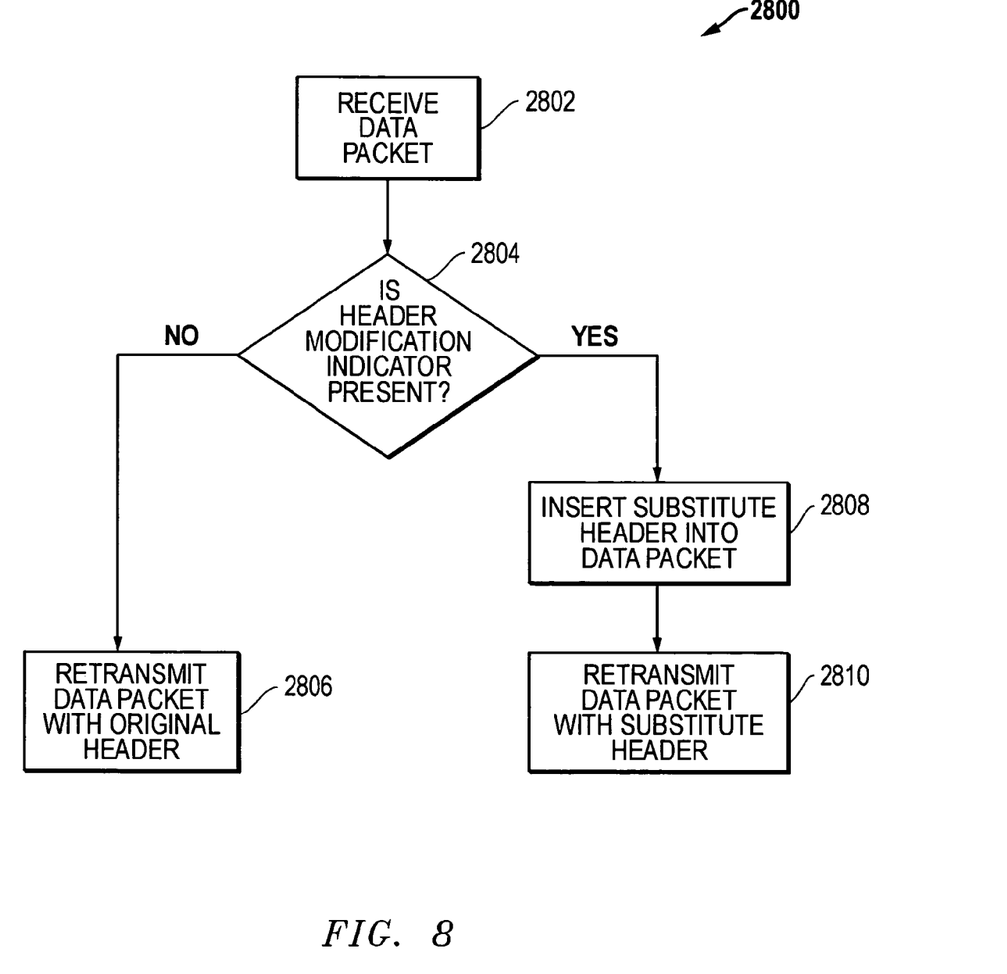
FIG. 8 illustrates header insertion logic according to one exemplary embodiment of the disclosed methods and systems.

FIG. 8 shows logic 2800 as it may be implemented according to one exemplary embodiment of the disclosed methods and systems at a network node (e.g., such as using a header modification module 2120 at a network node 2104 or 2106) for insertion of substitute header information into a received data packet for retransmittal. As shown, methodology 2800 starts in step 2802 where a data packet with an original header is received by the network node. An example of such a received data packet is data packet 2200 of FIG. 2 that has original header 2204. In step 2804 of FIG. 8, the received data packet is analyzed for presence of a header modification indicator, such as a header modification bit that is set active. If no header modification indicator is found to be present in the data packet, then the data packet is retransmitted in step 2806 with its original header to any other network destination/s included in the original header.

However, if a header modification indicator is found present in step 2804 of FIG. 8, then logic 2800 proceeds to step 2808 in which substitute header information (e.g., a complete substitute header) is inserted into the data packet in place of the original header information (e.g., the entire original header). In an embodiment where a network node is configured to insert one of two or more different substitute headers containing different destination information, then the appropriate substitute header may be selected in step 2808, e.g., based on information contained in the received data packet (e.g., based on the identity of a header modification bit set active in the received data packet). The data packet with the substitute header information is then transmitted in step 2810 to those network destination/s included in the substitute header. Substitution of the header is controlled by the header modification bit on a packet-by-packet basis. It will be understood that the particular steps and methodology of the embodiment of FIG. 8 are exemplary only, and that any other combination of fewer, additional and/or alternative steps may be employed that is suitable for processing and transferring data packets with substitute header information in a manner consistent with the methods and systems as disclosed herein.

The specification of U.S. patent application Ser. No. 11/600,934 entitled "Reconfigurable Communications Infrastructure for ASIC Networks" by Yancey, et al. filed on the same date as the present application and referred to elsewhere herein has been attached as an APPENDIX below.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of relaying data packets within a network, comprising:
   receiving a first data packet at a first network node from said network, said first data packet having an original header including first network destination information and a first header modification indicator, and said first network destination information including a network destination of said first network node;
   analyzing said received first data packet at said first network node to detect the presence of said first header modification indicator;
   replacing said original header of said first data packet at said first network node with a first substitute header based upon the detection of said first header modification indicator, said first substitute header including second network destination information that is different than said first network destination information of said original packet header, and said second network destination information including a network destination of at least one first additional network node that was not included in said first network destination information of said original packet header of said first data packet; and
   transmitting said first data packet having said first substitute header from said first network node across said network to said network destination of said at least one first additional network node that was not included in said first network destination information of said original packet header;
   wherein said network destination of said at least one first additional network node included in said first substitute header is the ultimate network destination for said first data packet;
   wherein said second network destination information is not included in said first data packet when it is received at said first network node; and
   wherein said first substitute header does not contain destination information of previous destinations of said first data packet.

2. The method of claim 1, wherein said original header corresponds to a first network protocol format; wherein said first substitute header corresponds to a second network protocol format different from said first network protocol format; and wherein said method further comprises using said first network protocol format to receive said first data packet having said original header at said first network node from said network, and using said second network protocol format to transmit said first data packet having said first substitute header from said first network node across said network to said network destination of said at least one first additional network node that was not included in said first network destination information of said original packet header.

3. The method of claim 1, wherein said second network destination information includes network destinations of two or more first additional network nodes not included in said first network destination information; and wherein said method further comprises transmitting said first data packet having said first substitute header from said first network node across said network to each of said network destinations of said two or more first additional network nodes not included in said first network destination information of said original packet header.

4. The method of claim 1, further comprising:
   receiving a second data packet at said first network node from said network, said second data packet having an original header including third network destination information and a second header modification indicator, and said third network destination information including a network destination of said first network node;
   analyzing said received second data packet at said first network node to detect the presence of said second header modification indicator;
   replacing said original header of said second data packet with a second substitute header at said first network node based upon the detection of said second header modification indicator, said second substitute header including fourth network destination information that is different than said third network destination information of said original packet header of said second data packet, and said fourth network destination information including a network destination of at least one second additional network node that was not included in said third network destination information of said original packet header; and
   transmitting said second data packet having said second substitute header from said first network node across said network to said network destination of said at least one second additional network node that was not included in said third network destination information of said original packet header;
   wherein said network destination of said at least one second additional network node is a different network destination than said network destination of said at least one first additional network node.

5. The method of claim 1, wherein said first data packet comprises a data payload, and wherein each of said first network node and said first additional network node comprises a computing device that processes data contained in said data payload.

6. The method of claim 5, wherein each of said first network node and said first additional network node comprises a field programmable gate array (FPGA) device.

7. A method of relaying data packets within a network, comprising:
- transmitting a first data packet from a first network node across said network to a second network node, said first data packet having an original header including first network destination information and a first header modification indicator, and said first network destination information including a network destination of said second network node;
- receiving said first data packet at said second network node from said network;
- analyzing said received first data packet at said second network node to detect the presence of said first header modification indicator;
- replacing said original header of said first data packet at said second network node with a first substitute header based upon the detection of said first header modification indicator, said first substitute header including second network destination information that is different than said first network destination information of said original packet header, and said second network destination information including a network destination of at least one first additional network node that was not included in said first network destination information of said original packet header of said first data packet;
- transmitting said first data packet having said first substitute header from said second network node across said network to said network destination of said at least one first additional network node that was not included in said first network destination information of said original packet header; and
- receiving said first data packet at said at least one first additional network node that was not included in said first network destination information of said original packet header;
- wherein said method further comprises creating said first header modification indicator at said first network node prior to said step of transmitting said first data packet from said first network node across said network to said second network node;
- wherein said network destination of said at least one first additional network node included in said first substitute header is the ultimate network destination for said first data packet;
- wherein said second network destination information is not included in said first data packet when it is transmitted from said first network node and received at said second network node; and
- wherein said first substitute header does not contain destination information of previous destinations of said first data packet.

8. The method of claim 7, further comprising:
- transmitting a second data packet from said first network node across said network to said second network node, said second data packet having an original header including third network destination information and a second header modification indicator, and said third network destination information including a network destination of said second network node;
- receiving said second data packet at said second network node from said network;
- analyzing said received second data packet at said second network node to detect the presence of said second header modification indicator;
- replacing said original header of said second data packet with a second substitute header at said second network node based upon the detection of said second header modification indicator, said second substitute header of said second data packet including fourth network destination information that is different than said third network destination information of said original packet header of said second data packet, and said fourth network destination information including a network destination of at least one second additional network node that was not included in said third network destination information of said original packet header;
- transmitting said second data packet having said second substitute header from said second network node across said network to said network destination of said at least one second additional network node that was not included in said third network destination information of said original packet header; and
- receiving said second data packet having said second substitute header at said at least one second additional network node that was not included in said third network destination information of said original packet header;
- wherein said method further comprises creating said second header modification indicator at said first network node prior to said step of transmitting said second data packet from said first network node across said network to said second network node; and
- wherein said network destination of said at least one second additional network node is a different network destination than said network destination of said at least one first additional network node.

9. The method of claim 7, wherein said first data packet comprises a data payload, and wherein each of said first network node and said first additional network node comprises a computing device that processes data contained in said data payload.

10. The method of claim 9, wherein each of said first network node and said first additional network node comprises a field programmable gate array (FPGA) device.

11. The method of claim 7, wherein each of said first network node and said first additional network node comprises a local destination within a given computing device, each of said first network node and said first additional network nodes being provided within the same given computing device.

12. The method of claim 11, wherein said computing device comprises a FPGA device.

13. The method of claim 7, wherein said first additional network node comprises a field programmable gate array (FPGA) device containing a packet router having multiple reader interfaces configured as packet sources and multiple writer interfaces configured as packet destinations; wherein said original header is a TCP/IP format header; wherein said first substitute header includes a header containing a routing code for said packet router that indicates a particular destination writer interface of said packet router; and wherein said method further comprises:
- receiving said first data packet at one of said multiple reader interfaces of said packet router contained in said FPGA;
- determining a particular destination writer interface of said multiple writer interfaces from said routing code contained within said first substitute header of said first data packet; and
- transmitting said received first data packet from said determined particular destination writer interface of said packet router.

14. A network node for relaying data packets within a network, said network node comprising a header modification module configured to:

receive a first data packet, said first data packet having an original header including first network destination information and a first header modification indicator, and said first network destination information including a network destination of said network node;

analyze said first data packet to detect the presence of said first header modification indicator;

replace said original header of said first data packet with a first substitute header based upon the detection of said first header modification indicator, said first substitute header including second network destination information that is different than said first network destination information of said original packet header, and said second network destination information including a network destination of at least one first additional network node that was not included in said first network destination information of said original packet header of said first data packet; and provide said first data packet having said first substitute header for transmittal from said network node across said network to said network destination of said at least one first additional network node that was not included in said first network destination information of said original packet header;

wherein said network destination of said at least one first additional network node included in said first substitute header is the ultimate network destination for said first data packet;

wherein said second network destination information is not included in said first data packet when it is received at said first network node; and wherein said first substitute header does not contain destination information of previous destinations of said first data packet.

15. The network node of claim 14, wherein said original header corresponds to a first network protocol format; and wherein said first substitute header corresponds to a second network protocol format different from said first network protocol format.

16. The network node of claim 14, wherein said second network destination information includes network destinations of two or more first additional network nodes not included in said first network destination information.

17. The network node of claim 14 wherein said header modification module is further configured to:

receive a second data packet, said second data packet having an original header including third network destination information and a second header modification indicator, and said third network destination information including a network destination of said network node;

analyze said received second data packet to detect the presence of said second header modification indicator;

replace said original header of said second data packet with a second substitute header at said first network node based upon the detection of said second header modification indicator, said second substitute header including fourth network destination information that is different than said third network destination information of said original packet header of said second data packet, and said fourth network destination information including a network destination of at least one second additional network node that was not included in said third network destination information of said original packet header; and provide said second data packet having said second substitute header for transmittal from said network node across said network to said network destination of said at least one second additional network node that was not included in said third network destination information of said original packet header;

wherein said network destination of said at least one second additional network node is a different network destination than said network destination of said at least one first additional network node.

18. The network node of claim 14, wherein said first data packet comprises a data payload, and wherein said network node comprises a computing device that processes data contained in said data payload.

19. The network node of claim 18, wherein said network node comprises a field programmable gate array (FPGA) device.

20. A network for processing data, comprising:

a first network node;
a second network node; and
at least one first additional network node;

wherein said first network node is configured to create a first header modification indicator in a first data packet and to transmit said first data packet across said network to said second network node, said transmitted first data packet having an original header including first network destination information and said first header modification indicator, and said first network destination information including a network destination of said second network node;

wherein said second network node is configured to receive said first data packet, and analyze said received first data packet to detect the presence of said first header modification indicator;

wherein said second network node is further configured to replace said original header of said first data packet with a first substitute header based upon the detection of said first header modification indicator, said first substitute header including second network destination information that is different than said first network destination information of said original packet header, and said second network destination information including a network destination of said at least one first additional network node that was not included in said first network destination information of said original packet header of said first data packet;

wherein said second network node is further configured to transmit said first data packet having said first substitute header across said network to said network destination of said at least one first additional network node that was not included in said first network destination information of said original packet header;

wherein said network destination of said at least one first additional network node included in said first substitute header is the ultimate network destination for said first data packet;

wherein said first network node is configured to transmit said first data packet across said network to said second network node without said second network destination information included in said first data packet; and wherein said first substitute header does not contain destination information of previous destinations of said first data packet.

21. The network of claim 20, wherein said original header corresponds to a first network protocol format;

wherein said first substitute header corresponds to a second network protocol format different from said first network protocol format; and wherein said first network node is configured to use said first network protocol format to transmit said first data packet having said original header to said second network node, and wherein said second network node is configured to use said second network protocol format to transmit said first data packet having said first substitute header across said network to said network destination of said at least one first additional network node that was not included in said first network destination information of said original packet header.

22. The network of claim 20, wherein said second network destination information includes network destinations of two or more first additional network nodes not included in said first network destination information; and wherein said second network node is configured to transmit said first data packet having said first substitute header across said network to each of said network destinations of said two or more first additional network nodes not included in said first network destination information of said original packet header.

23. The network of claim 20, wherein said first network node is configured to create a second header modification indicator in a second data packet and to transmit said second data packet across said network to said second network node, said second data packet having an original header including third network destination information including a network destination of said second network node; wherein said second network node is configured to receive said second data packet from said network; wherein said second network node is further configured to analyze said received second data packet to detect the presence of said second header modification indicator; and wherein said second network node is further configured to replace said original header of said second data packet with a second substitute header based upon the detection of said second header modification indicator, said second substitute header of said second data packet including fourth network destination information that is different than said third network destination information of said original packet header of said second data packet, and said fourth network destination information including a network destination of at least one second additional network node that was not included in said third network destination information of said original packet header; wherein said second network node is further configured to transmit said second data packet having said second substitute header across said network to said network destination of said at least one second additional network node that was not included in said third network destination information of said original packet header; and wherein said network destination of said at least one second additional network node is a different network destination than said network destination of said at least one first additional network node.

24. The network of claim 20, wherein each of said first network node and said first additional network node comprises a computing device that processes data contained in a data payload of said first packet.

25. The network of claim 24, wherein each of said first network node and said first additional network node comprises a field programmable gate array (FPGA) device.

26. The network of claim 20, wherein each of said first network node and said first additional network node comprises a local destination within a given computing device, each of said first network node and said first additional network nodes being provided within the same given computing device.

27. The network of claim 26, wherein said computing device comprises a FPGA device.

28. The network of claim 20, wherein said first additional network node comprises:

a field programmable gate array (FPGA) device containing a packet router having multiple reader interfaces configured as packet sources and multiple writer interfaces configured as packet destinations;

wherein said original header is a TCP/IP format header;

wherein said first substitute header includes a header containing a routing code for said packet router that indicates a particular destination writer interface of said packet router; and wherein said packet router contained in said FPGA is configured to receive said first data packet at one of said multiple reader interfaces and to determine a particular destination writer interface of said multiple writer interfaces from said routing code contained within said first substitute header of said first data packet, and to transmit said received first data packet from said determined particular destination writer interface of said packet router.

29. A method of relaying data packets within a network, comprising:

transmitting a first data packet from a first network node across said network to a second network node, said first data packet having an original header including first network destination information and a first header modification indicator, and said first network destination information including a network destination of said second network node;

receiving said first data packet at said second network node from said network;

analyzing said received first data packet at said second network node to detect the presence of said first header modification indicator;

replacing said original header of said first data packet at said second network node with a first substitute header based upon the detection of said first header modification indicator, said first substitute header including second network destination information that is different than said first network destination information of said original packet header, and said second network destination information including a network destination of at least one first additional network node that was not included in said first network destination information of said original packet header of said first data packet;

transmitting said first data packet having said first substitute header from said second network node across said network to said network destination of said at least one first additional network node that was not included in said first network destination information of said original packet header;

receiving said first data packet at said at least one first additional network node that was not included in said first network destination information of said original packet header;

analyzing said received first data packet at said first additional network node to detect the presence of a second header modification indicator;

replacing said first substitute header of said first data packet at said first additional network node with a second substitute header based upon the detection of said second header modification indicator, said second substitute header including third network destination information that is different than said first network destination information of said original packet header and said second network destination information of said first substitute header, and said third network destination information including a network destination of at least one second additional network node that was not included in said first network destination information of said original packet header of said first data packet or said second network destination information of said first substitute header of said first data packet;

transmitting said first data packet having said second substitute header from said first additional network node across said network to said network destination of said at least one second additional network node that was not included in said first network destination information of said original packet header or said second network destination information of said first substitute header; and receiving said first data packet at said at least one second additional network node that was not included in said first network destination information of said original packet header or said second network destination information of said first substitute header;

wherein said method further comprises creating said second header modification indicator prior to said step of transmitting said first data packet from said first additional network node across said network to said second additional network node;

wherein said network destination of said at least one second additional network node included in said second substitute header is the ultimate network destination for said first data packet;

wherein said second network destination information is not included in said first data packet when it is transmitted from said first network node and received at said second network node;

wherein said first substitute header does not contain destination information of previous destinations of said first data packet;

wherein said third network destination information is not included in said first data packet when it is transmitted from said first additional network node and received at said second additional network node; and wherein said second substitute header does not contain destination information of previous destinations of said first data packet.

30. A network for processing data, comprising:
a first network node;
a second network node;
at least one first additional network node; and
at least one second additional network node;

wherein said first network node is configured to create a first header modification indicator in a first data packet and to transmit said first data packet across said network to said second network node, said transmitted first data packet having an original header including first network destination information and said first header modification indicator, and said first network destination information including a network destination of said second network node;

wherein said second network node is configured to receive said first data packet from said first network node, and analyze said received first data packet to detect the presence of said first header modification indicator;

wherein said second network node is further configured to replace said original header of said first data packet with a first substitute header based upon the detection of said first header modification indicator, said first substitute header including second network destination information that is different than said first network destination information of said original packet header, and said second network destination information including a network destination of said at least one first additional network node that was not included in said first network destination information of said original packet header of said first data packet;

wherein said second network node is further configured to transmit said first data packet having said first substitute header across said network to said network destination of said at least one first additional network node that was not included in said first network destination information of said original packet header;

wherein said first additional network node is configured to receive said first data packet, and analyze said received first data packet to detect the presence of a second header modification indicator;

wherein said first additional network node is further configured to replace said first substitute header of said first data packet with a second substitute header based upon the detection of said first header modification indicator, said second substitute header including third network destination information that is different than said first network destination information of said original packet header and said second network destination information of said first substitute header, and said third network destination information including a network destination of said least one second additional network node that was not included in said first network destination information of said original packet header of said first data packet or said second network destination information of said first substitute header of said first data packet;

wherein said first additional network node is further configured to transmit said first data packet having said second substitute header across said network to said network destination of said at least one second additional network node that was not included in said first network destination information of said original packet header or said second network destination information of said first substitute header;

wherein said network destination of said at least one second additional network node included in said second substitute header is the ultimate network destination for said first data packet;

wherein said first network node is configured to transmit said first data packet across said network to said second network node without said second network destination information included in said first data packet;

wherein said first substitute header does not contain destination information of previous destinations of said first data packet;

wherein said first additional network node is configured to transmit said first data packet across said network to said second additional network node without said third network destination information included in said first data packet;

and wherein said second substitute header does not contain destination information of previous destinations of said first data packet.

* * * * *